United States Patent [19]

Paley et al.

[11] Patent Number: 5,481,957
[45] Date of Patent: Jan. 9, 1996

[54] AIMING AND POINTING SYSTEM FOR GROUND BASED WEAPONS EQUIPMENT

[75] Inventors: Isadore R. Paley, Rockway; George Galuschak, Hasbrouck Heights; Thomas Beneventano, Washington Township; Alex R. Strashinsky, Jr., Whippany, all of N.J.

[73] Assignee: AlliedSignal Inc., Morris Township, N.J.

[21] Appl. No.: 909,325

[22] Filed: Jul. 6, 1992

[51] Int. Cl.[6] .................................................... F41G 3/10
[52] U.S. Cl. .................... 89/41.19; 89/41.09; 235/407; 364/423
[58] Field of Search .................... 33/236; 89/41.09, 89/41.19; 235/407; 342/359; 364/423

[56] References Cited

U.S. PATENT DOCUMENTS

| | | | |
|---|---|---|---|
| 4,166,406 | 9/1979 | Maughmer | 89/41.09 |
| 4,409,468 | 10/1983 | Mayer et al. | 89/41.19 |
| 4,632,012 | 12/1986 | Feige et al. | 89/41.19 |
| 4,686,771 | 8/1987 | Bevenentano et al. | 33/324 |
| 4,924,749 | 5/1990 | Beyer et al. | 89/41.09 |
| 4,945,647 | 8/1990 | Beneventano et al. | 33/321 |

FOREIGN PATENT DOCUMENTS

| | | | |
|---|---|---|---|
| 3229819 | 2/1984 | Germany | 89/41.09 |
| 1389587 | 4/1975 | United Kingdom | 89/41.19 |

*Primary Examiner*—Stephen C. Bentley
*Attorney, Agent, or Firm*—Howard G. Massung

[57] ABSTRACT

Azimuth and elevation information relating to ground based weapons equipment is inputted to a north finding system. The system determines angular azimuth and elevation errors and transmits signals to a display arrangement for indicating the direction to rotate the system so as to eliminate the errors. As the system is aimed, a gyro included in the north finding system measures angular rotation about its input axis and accelerometers measure the change in tilt. The computer projects the rotations to the horizontal plane and determines the change in azimuth. This is a continuous procedure until all errors are eliminated.

8 Claims, 3 Drawing Sheets

AIMING AND POINTING SYSTEM FOR GROUND BASED WEAPONS EQUIPMENT

BACKGROUND OF THE INVENTION

This invention relates generally to aiming and pointing systems for ground based weapons equipment and, particularly, to a system of the type described using a north finding system. More particularly, this invention relates to a system which provides operating personnel with the pointing angles of a weapon relative to north and local horizontal and relative to a target.

Prior art systems for the purposes described feature a gyrocompassing device using a conventional spinning wheel two axis gyroscope (gyro) to find the pointing angle of the weapon relative to north. The angle is then transferred optically to a fixed standard called an aiming circle. The device is removed from the weapon before firing. All corrections for angular errors caused by firing are subsequently removed by optically re-aligning the weapon to the aiming circle.

Gyrocompassing devices are known which feature a stabilized reference package. An arrangement of this type includes a precision gyro that is maintained in the horizontal position by isolating the gyro from the weapon on a stabilized platform. This technology is necessarily cumbersome and expensive because it requires mechanism including at least three gyroscopes, two level sensing devices and three gimbals.

Strapped down ring laser gyro packages are also known. Again, this technology is more cumbersome and more expensive than otherwise desired because it must include three ring laser gyros and three accelerometers, as will be appreciated by those skilled in the art.

The aforementioned prior art arrangements present several problems that need to be solved. For example, the weapon must be leveled to within 0.25 degrees from the horizontal in order to gyrocompass. Spinning wheel gyroscopes have degraded accuracies when gyrocompassing at tilts due to mass unbalance error terms and characteristics. Even when leveled, such arrangements are only marginally accurate for long range projectiles. Typical accuracy is five mils (one sigma).

Further, spinning wheel systems cannot be permanently affixed to the weapon during transportation or firing because the vibration and shock which ensues reduces system reliability. Consequently, these systems only obtain the initial pointing angle of the weapon and are not usable to provide continuous pointing data while the weapon is being aimed or after firing. Also, mounting and dismounting these systems is, at best, inefficient and even dangerous during weapon firing conditions.

Also, relying on the aforementioned optical transferring of the pointing angle to an aiming circle prevents using current optical technologies when obscuring conditions, such as rain, snow, smoke, or other environmental abnormalities, occur. Also, optical transfer techniques are time consuming and are subject to human error.

Technologies using three gyros, require that the gyros be sufficiently accurate to use for the purposes intended and hence, are too expensive for practical application.

The present invention overcomes these problems and has several other significant advantages. For example, with the arrangement to be herein described, gyrocompassing can be performed for any weapon pointing elevation up to twenty-five degrees from the horizontal because the gyro used, which is preferably a ring laser gyro, or any other type gyro unaffected by mass unbalance error characteristics, is insensitive to tilts. No time is required to level the weapon for gyrocompassing, and after gyrocompassing the system will continue to measure the weapon pointing angles for any weapon attitude. Further, the accuracy of the system described herein has been found to be equal or less than one mil under military environmental conditions.

Also, the present system can be permanently affixed to the weapon. It is inherently rugged in design and is tolerant to shock and vibration. Therefore, constant updates of the weapon pointing angles are provided while the weapon is being slewed to the target direction.

A particular feature of the invention is that it contains its own displays to indicate aiming angles so as to be useful under a variety of otherwise interfering environmental conditions. Additionally, the system can be used to re-align the weapon immediately after firing without any auxiliary equipment.

Further, the present invention enables the performance requirements to be met by using a single gyro and two accelerometers as sensors. Thus, the design is more economical when compared to systems for the purposes described now known in the art.

SUMMARY OF THE INVENTION

This invention contemplates an aiming and pointing system for ground based weapons equipment including a north finding system, and a display arrangement. The north finding system is affixed to the rotating part of the weapon structure so that it rotates with a pointed weapon. The north finding system includes the inertial components, electronics and computer that are used to find and continuously measure the azimuth and tilt angles of the pointed weapon. The north finding system is only applicable to the measurement of the initial pointing angles. The present invention extends the north finding system as required to perform the aiming function after gyrocompassing is completed.

A gyro in the north finding system is offset from the horizontal plane at a sufficiently high angle to insure that (1) the gyro input axis can measure a horizontal component at earth's rate for gyrocompassing; and (2) the gyro input axis can measure a vertical component of rotation during the azimuth tracking mode of the device. This can be accomplished by offsetting the system chassis, the platform within the chassis and the gyro within the platform.

The display arrangement includes a keyboard, whereby controlling personnel can command the north finding system to perform its functions and to input data needed for north finding system calculations. The arrangement displays the azimuth, elevation and cant orientations of the weapon in real time; the target azimuth and elevation orientations in real time; the difference between the target and weapon angles in real time; and other pertinent data needed to perform a specific mission.

The display arrangement further includes indicating means to show a gunner the direction in which the weapon must be slewed to point at the target, and when the weapon is properly aimed.

DETAILED DESCRIPTION OF THE INVENTION

Figure 1:
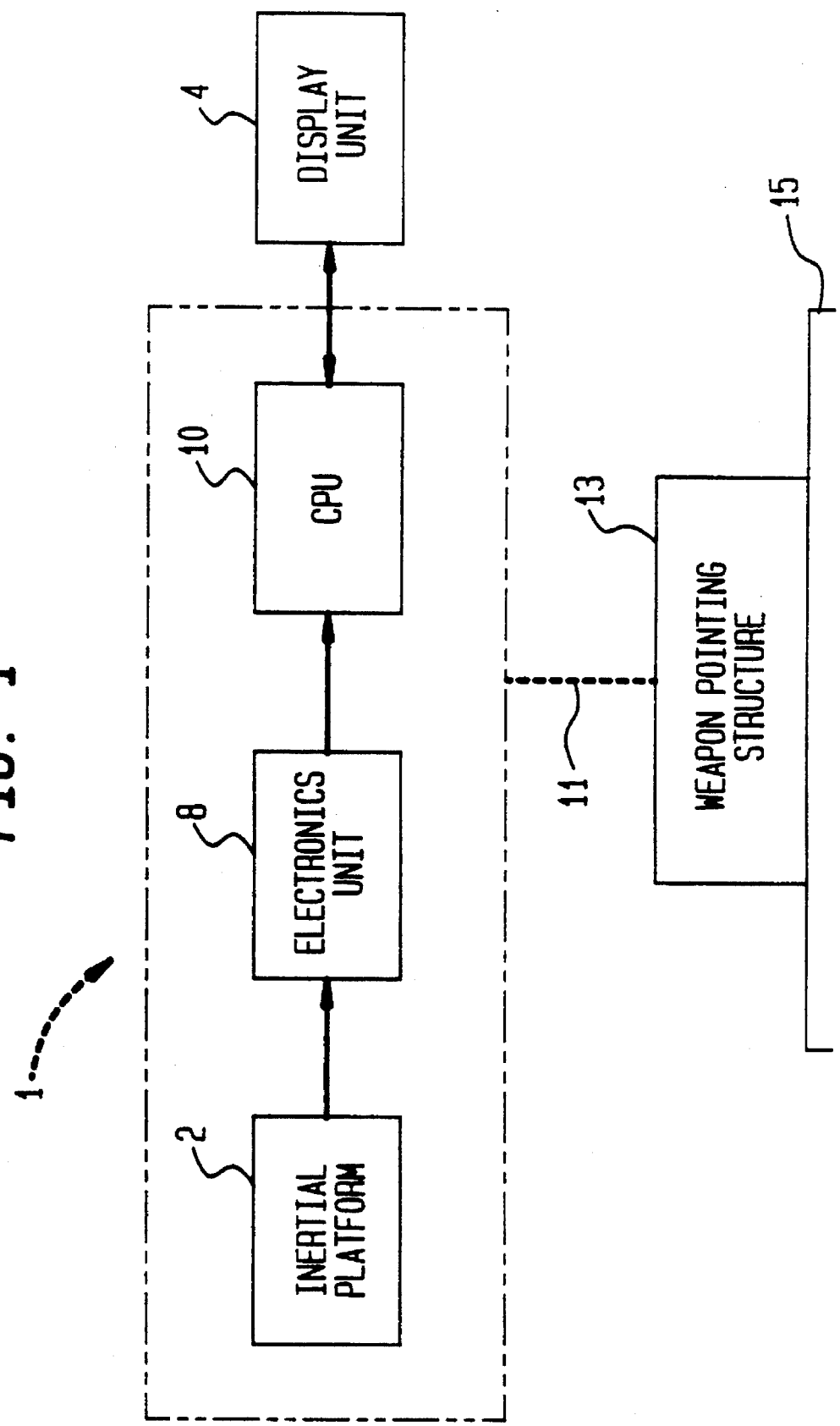
FIG. 1 is a block diagram generally illustrating the invention.

With reference to FIG. 1, a north finding system is designated by the numeral 1 and includes an inertial platform 2 and a display unit 4. An electronics unit 8 is connected to inertial platform 2 and a central processing unit (CPU) 10 is connected to electronics unit 8. Central processing unit 10 is connected to display unit 4 in an input/output configuration, North finding system 1 including inertial platform 2, electronics unit 8 and CPU 10 is mounted via suitable means 11 to the rotating part of a weapon pointing structure 13 of ground based weapons equipment 15 so that the north finding system rotates with the ground based weapons equipment.

Components 2, 4, 8 and 10 and the detailed interaction therebetween will be next described with reference to FIG. 2, with elements corresponding to those in FIG. 1 carrying corresponding numerical designations.

Figure 2:
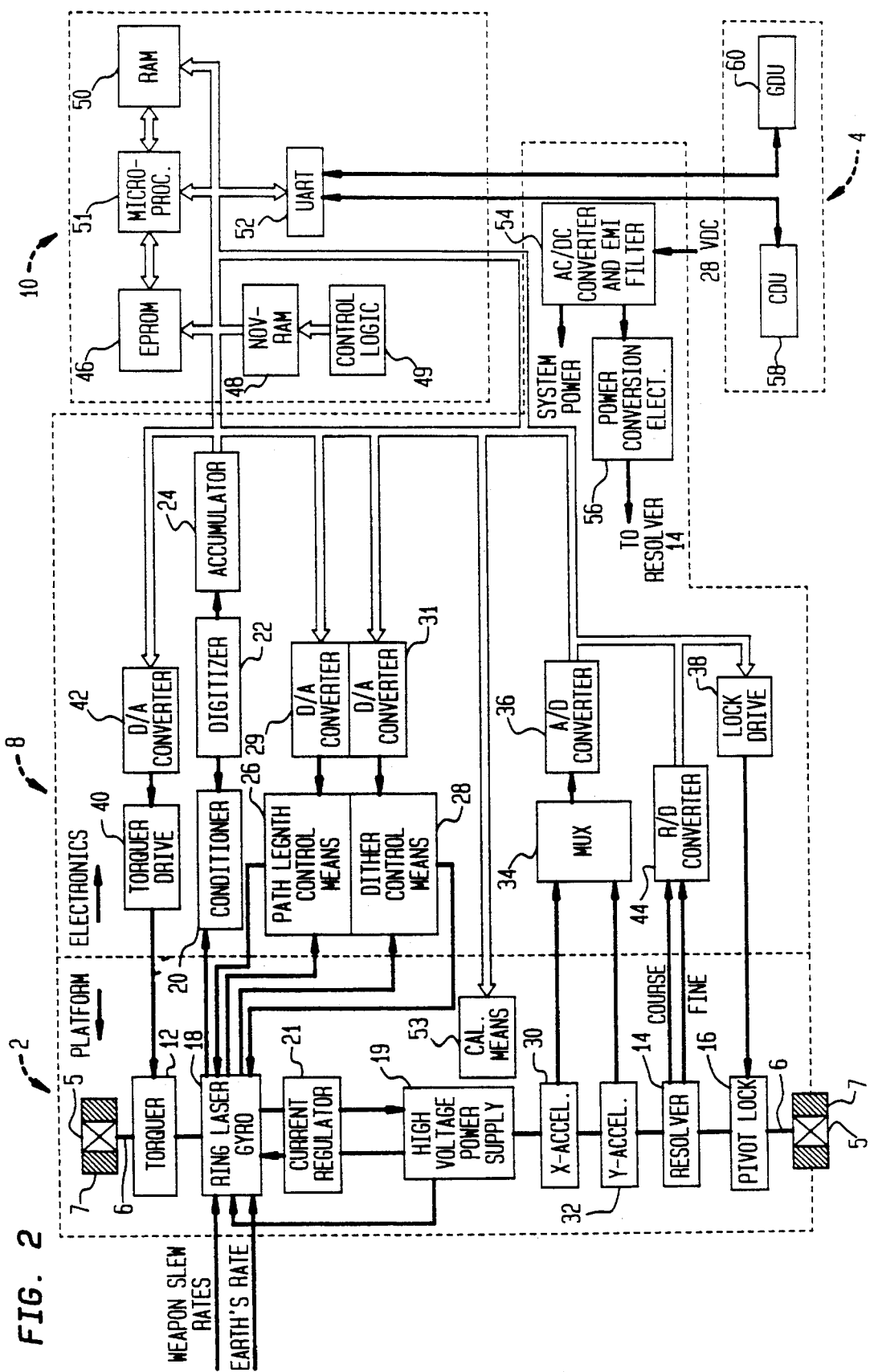
FIG. 2 is a functional block diagram of the invention.

With reference now to FIG. 2, inertial platform 2 includes the several inertial instruments of north finding system 1 which are mounted on a pivot 6. Pivot 6 is utilized to implement gyrocompassing indexing positions.

Electronics unit 8 includes gyro support circuitry and pivot indexing circuitry. Electronics unit 8 and CPU 10 provide the required control, compensation, computation and interface functions for the north finding system 1 and for display unit 4.

Pivot 6 rotatably supported by bearings 5 in a case or housing 7 provides the capability for indexing the several inertial instruments to the various positions required for gyrocompassing. Pivot 6 supports a torquer 12 to provide a drive capability, a resolver 14 to provide angular read out and pivot lock 16 which is energized to allow rotation or indexing of pivot 6 but is otherwise locked to "strap down" the platform module. It will be recognized by those skilled in the art that resolver 14 may be replaced by a suitable optical encoder.

Gyrocompassing data is always collected with pivot 6 locked, i.e. lock 16 de-energized. A gyroscope (gyro) 18 which is a gyro of the type insensitive to force unbalance effects, and is thus preferably a ring laser gyro, senses earth's rate during the north finding mode of the system and provides a fringe rate signal that is a frequency modulated analog signal with a frequency proportional to rotational rate. Ring laser gyro 18 senses weapon slew rates after north finding by virtue of north finding system 1 being mounted to the rotating portion of weapon structure 13, as described with reference to FIG. 1.

Ring laser gyro 18 provides a fringe rate signal that is a frequency modulated analog signal having a frequency proportional to rotational rate. This signal is conditioned, digitized and accumulated via conditioner 20, digitizer 22 and accumulator 24 for software processing. Ring laser gyro 18 provides a laser beam intensity signal and dither instantaneous amplitude signals. These signals are processed via pathlength control means 26 and dither control means 28 which are controlled by CPU 10 via D/A converters 29 and 31, respectively. Ring laser gyro 18 is powered by a high voltage power supply 19 via a current regulator 21.

X-accelerometer 30 and Y-accelerometer 32 are used to measure the tilt of gyro 18 and to measure host equipment, i.e. weapon 15, base motion in the gyrocompassing implementation, Analog outputs provided by accelerometers 30 and 32 are analog DC voltages which are multiplexed via a multiplexer (MUX) 34 and digitized via an A/D converter 36, and thereafter applied to CPU 10. In another embodiment of the invention, these voltages would be processed by voltage to frequency converters and thereafter applied to CPU 10 as will be recognized by those skilled in the art.

Electronics 8 provides control of pivot 6 as aforenoted. A lock drive 38 is activated by CPU 10 to release pivot 6 for rotation and is de-activated by the CPU for re-locking the pivot.

A torquer drive 40 energizes torquer 12 in response to torquer commands provided by CPU 10 via a D/A converter 42 to index pivot 6. Resolver information, i.e. course and fine, is digitized by a resolver to digital (R/D) converter 44 to provide the required pivot positioning and referencing of the several inertial instruments to platform module mounting pads (not otherwise shown).

To the extent so far described, north finding system 1 is such as that disclosed in commonly assigned U.S. Pat. No. 4,945,647 which issued to Thomas Beneventano on Aug. 7, 1990. Only as much of said description has been included herein in order to fully understand the invention. The full description and the analytical discussion relating thereto are included in the aforementioned U.S. Pat. No. 4,945,647, the same being incorporated herein by reference.

CPU 10 is of the type which uses a conventional chip and a complement of peripherals. Memory is comprised of an EPROM 46, a NOVRAM 48 and a RAM 50. A microprocessor 51 is connected between EPROM 46 and RAM 50. A NOVRAM calibration means 53 is utilized for storage of inertial instrument and alignment calibration constants and permits updating of these parameters when required. NOVRAM 48 is controlled by control logic 49.

A universal asynchronous receiver/transmitter (UART) 52 is connected to the CPU memory via microprocessor 51 and is connected via input/output lines to a control and display unit 58 and a gunner display unit 60, both of which are included in display unit 4. Control and display unit (CDU) 58 accommodates a keyboard used for commanding the north finding system to perform its functions and to input data needed for north finding system calculations. CDU 58 displays the weapon azimuth, elevation and cant in real time; the target azimuth and elevation in real time; the difference between the target and weapon angles in real time; and other pertinent data needed to perform a particular mission. In this regard, CDU 58 is operated by a weapons control officer or like personnel.

Gunner display unit (GDU) 60 is an indicator type device. A device which may be used with the present invention contains, for example, a vertical row of lighted arrows, a horizontal row of lighted arrows and a lighted indicator at the intersection of the horizontal and vertical rows. The arrows show a gunner the direction in which the weapon must be slewed to point at the target. The number of arrows indicates the magnitude of movement needed to align to the target. As the weapon moves closer to the target angle, the furthest arrows from the center are extinguished. When all of the arrows are extinguished and the center indicator is lighted, the gunner is then insured that the weapon is properly aimed.

Electronics unit 8 further includes a DC/DC converter 54 with an electromagnetic interference (EMI) filter to assure electromagnetic compatibility and likewise includes power conversion electronics 56 for producing the required sinusoidal excitation for resolver 14. In this regard, reference is again made to the aforementioned U.S. Pat. No. 4,945,647.

Figure 3:
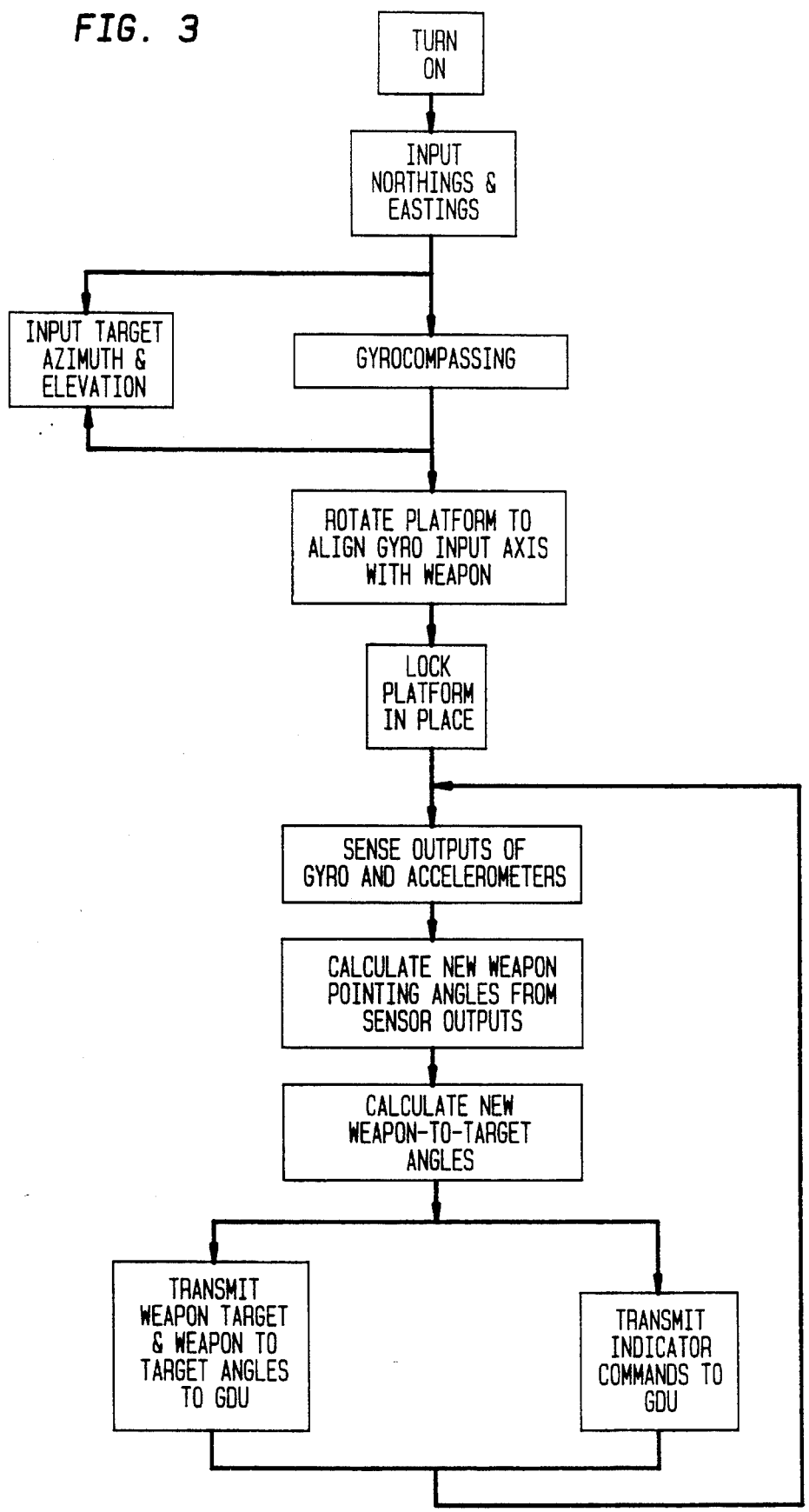
FIG. 3 is a flow chart illustrating the operating sequence of the invention.

Reference is now made to FIG. 3, which illustrates the operating sequence of the invention. Thus, upon the system of the invention being turned on, northings and eastings and target azimuth and elevation data are inputted to CPU 10 via operator operated CDU 58. CPU 10 is thereupon effective for rotating inertial platform 2 to align the input axis of gyro 18 (FIG. 2) with weapon 15 (FIG. 1). Inertial platform 2 is locked in place via CPU 10 (FIG. 2) which controls lock drive 38 and pivot lock 16 (FIG. 2).

The outputs of gyro 18 and accelerometers 30 and 32 (FIG. 2) are sensed and are used by CPU 10 to determine new weapon pointing angles and new weapon-to-target angles.

The determined angle information is transmitted to CDU 58 (FIG. 2) for being displayed thereon and is transmitted to GDU 60 (FIG. 2) to provide an indication for gunner personnel.

CDU 58 and GDU 60 transmit outputs which are combined with the sensed outputs of the gyros and accelerometers to re-calculate the pointing angles and weapon-to-target angles.

It will now be recognized that a system has been described which accommodates modern warfare logistics calling for highly maneuverable ground forces. The system enables large mobile weapons to be quickly and accurately set up for target engagement after being emplaced at a new site. Azimuth elevation and cant of a weapon can be determined within a relatively short time from system activation at the emplacement site. The system contains its own display to indicate the pointing angle of the weapon. Means are provided for applying inputs corresponding to desired target aiming angles into the system. The system then displays the direction and magnitude that the weapon must be rotated to align to the target.

While the weapon is being slewed to the target, two separate displays, i.e. the CDU and the GDU displays, provide continuous updates of the relationship of the gun-to-target angles.

When aligned to the target within a specified accuracy, an indication is provided which alerts operating personnel that no further adjustments are necessary. In this regard, it will be noted that it can be expected that the weapon will shift away from the target due to the recoil of firing. The system measures this angular movement and can be used to rapidly re-acquire the target in the same manner as for the original aiming.

Thus, a self-contained automatic system is disclosed which is used to determine azimuth and elevation data for a weapon pointing system. North and attitude references for the pointing system are provided and which references are maintained during operation of the weapon. Information is provided to operating personnel indicating angular errors to the desired pointing direction and displays are provided to the operating personnel when the weapon is properly aligned.

With the above description of the invention in mind, reference is made to the claims appended hereto for a definition of the scope of the invention.

What is claimed is:

1. An aiming and pointing system for ground based weapons equipment, comprising:

north finding means mounted to a rotating part of ground based weapons equipment so as to rotate therewith when said equipment is pointed and including an inertial platform for supporting inertial instrumentation including a single gyroscope having one input axis for sensing earth's rate during north finding and the weapons equipment slew rate after north finding, with said north finding means being effective for continuously sensing the azimuth and elevation angles of the pointed equipment and for providing corresponding signals, and further including control means;

display and indicating means connected in an output mode to the control means and operator-operated in the output mode for applying signals corresponding to the azimuth and elevation angles of a target and signals corresponding to the slew rate of the equipment to the control means;

said control means being responsive to the equipment azimuth and elevation signals and the target azimuth and elevation signals for controlling the inertial platform to align the one gyro input axis with the weapons equipment, and providing output signals; and the display and indicating means connected in an input mode to the control means and responsive to the output signals provided thereby for displaying at least equipment azimuth, elevation and cant angles in real time, target azimuth and elevation signals in real time, and the differences between said equipment and target angles in real time, and for indicating the direction in which the equipment must be slewed to point at the target and when the equipment is properly aimed.

2. An aiming and pointing system for ground based weapons equipment, comprising:

means mounted to a rotating part of ground based weapons equipment so as to rotate therewith when said equipment is pointed;

the equipment mounted means including means having one input axis for finding north and for sensing earth's rate during north finding and for sensing the equipment slew rate after north finding, with said equipment mounted means being effective for continuously sensing the azimuth and elevation angles of the pointed equipment and for providing corresponding signals;

control means associated with the equipment mounted means;

display and indicating means connected in an output mode to the control means and operator-operated in the output mode for applying signals corresponding to the azimuth and elevation angles of a target and applying signals corresponding to the slew rate of the equipment to the control means;

said control means being responsive to the equipment azimuth and elevation signals and target azimuth and elevation signals for controlling the equipment mounted means to align the one input axis of the sensing means with the equipment, and providing output signals; and the display and indicating means connected in an input mode to the control means and responsive to the output signals provided thereby for displaying at least equipment azimuth, elevation and cant angles in real time, target azimuth and elevation signals in real time and the differences between said equipment and target signals in real time, and for indicating the direction in which the equipment must be slewed to point at the target and when the equipment is properly aimed.

3. A system as described by claim 1, wherein:

the gyroscope is of the type without a spinning mass so as to be insensitive to mass unbalance error effects.

4. A system as described by claim 2, wherein:

the means for sensing earth's rate and the equipment slew rate includes a gyroscope of the type without a spinning mass so as to be insensitive to mass unbalance error effects.

5. An improved north finding means of the type wherein an inertial platform supports instrumentation including a single gyroscope of the type without a spinning mass so as to be insensitive to mass unbalance effects, said gyroscope having one input axis, and control means, the improvement comprising:

an aiming and pointing system for ground based weapons equipment;

the north finding means mounted to a rotating part of the ground based weapons equipment so as to rotate therewith when said equipment is pointed, the gyroscope being effective for sensing earth's rate during north finding and equipment slew rate after north finding;

said north finding means being effective for continuously sensing the azimuth and elevation angles of the pointed equipment and for providing corresponding signals;

display and indicating means connected in an output mode to the control means and operator-operated in the output mode for applying signals corresponding to the azimuth and elevation angles of a target and applying signals corresponding to the slew rate of the equipment to said control means with the control means being responsive to all of said signals for controlling the inertial platform to align the one gyro input axis with the weapons equipment, and providing output signals; and the display and indicating means connected in an input mode to the control means and responsive to the output signals provided thereby for displaying at least equipment azimuth elevation and cant angles in real time, target and elevation signals in real time and the differences between said equipment and target signals in real time, and for indicating the direction in which the equipment must be slewed to point at the target and when the equipment is properly aimed.

6. A method for aiming and pointing ground based weapons equipment, comprising:

mounting a north finding system including an inertial platform to a rotating part of ground based weapons equipment so that the north finding system rotates therewith;

inputting northings and eastings and azimuth and elevation angles of a target to the north finding system;

supporting a single gyroscope having one input axis on the inertial platform;

aligning the one input axis of the gyroscope with the weapons equipment;

sensing the output of the inertial platform;

using the sensed inertial platform output to determine weapon pointing angles and weapon-to-target angles;

using the determined angles for displaying at least equipment azimuth, elevation and cant angle information in real time, target azimuth and elevation angle information in real time, and the difference between the equipment and target angle information in real time, and for indicating information as to the direction the equipment must be slewed to point at the target and when the equipment is properly aligned; and combining the displayed and indicated information with the sensed gyroscope output for re-determining weapon pointing angles and weapon-to-target angles.

7. A method as described by claim 6, wherein supporting a gyroscope on the inertial platform includes:

supporting a gyroscope of the type without a spinning mass so as to be insensitive to mass unbalance effects.

8. A method as described by claim 6, wherein aligning the one input axis of the gyroscope with the weapons equipment includes:

rotating the inertial platform to align the one input axis of the gyroscope with the weapons equipment; and locking the rotated inertial platform in place.

* * * * *